(No Model.) 3 Sheets—Sheet 1.
A. A. INGRAHAM.
CIRCUIT CONNECTION FOR ELECTRIC CAR MOTORS.
No. 455,019. Patented June 30, 1891.
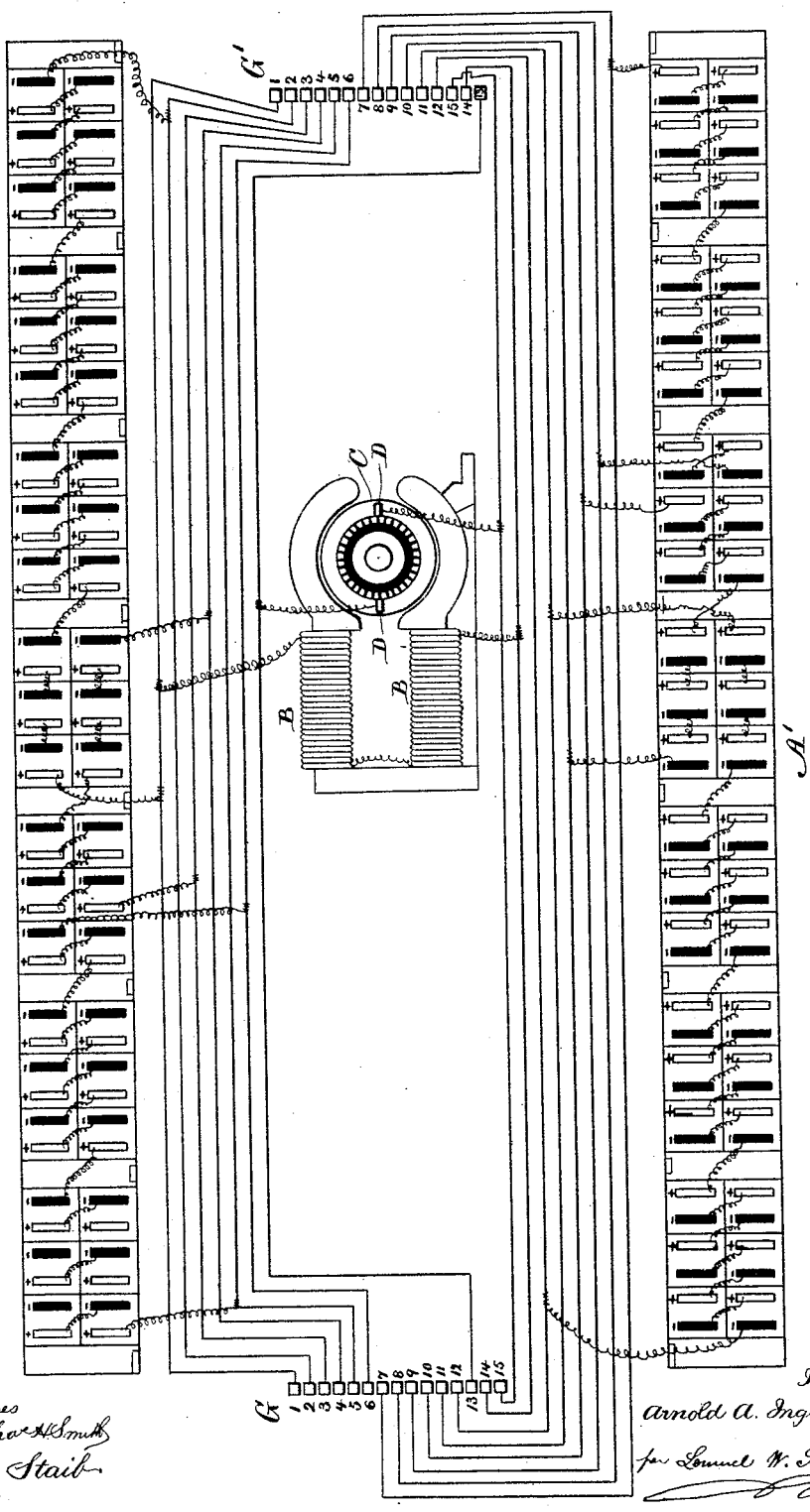

(No Model.) 3 Sheets—Sheet 2.
A. A. INGRAHAM.
CIRCUIT CONNECTION FOR ELECTRIC CAR MOTORS.
No. 455,019. Patented June 30, 1891.

Inventor
Arnold A. Ingraham
per Lemuel W. Serrell
Atty

Witnesses
Chas H Smith
J. Staib (No Model.) 3 Sheets—Sheet 3.
A. A. INGRAHAM.
CIRCUIT CONNECTION FOR ELECTRIC CAR MOTORS.
No. 455,019. Patented June 30, 1891.
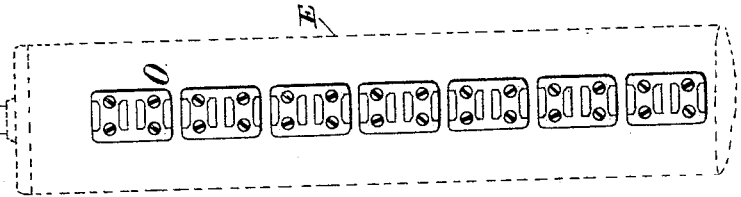
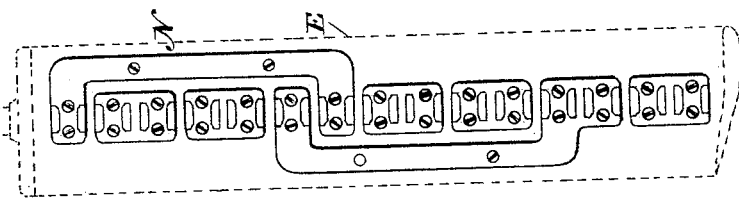
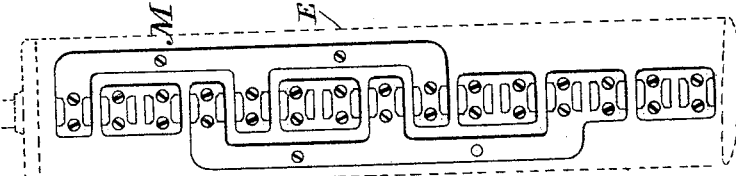
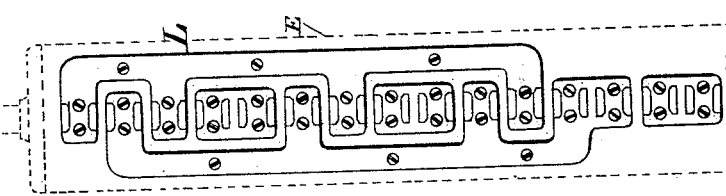
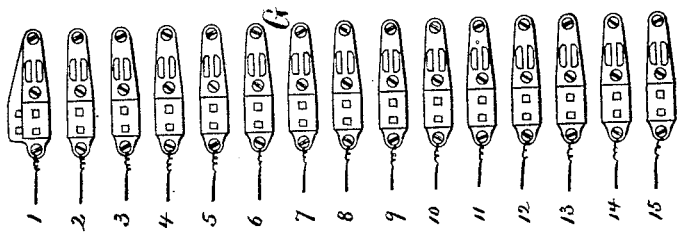
Witnesses
Chas H Smith
J. Staib
Inventor
Arnold A. Ingraham
for Lemuel W. Serrell
atty

UNITED STATES PATENT OFFICE.

ARNOLD A. INGRAHAM, OF NEW YORK, N. Y.

CIRCUIT-CONNECTION FOR ELECTRIC-CAR MOTORS.

SPECIFICATION forming part of Letters Patent No. 455,019, dated June 30, 1891.

Application filed November 18, 1889. Serial No. 330,745. (No model.)

*To all whom it may concern:*

Be it known that I, ARNOLD A. INGRAHAM, a citizen of the United States, residing at the city and State of New York, have invented an Improvement in Circuit-Connections for Electric-Car Motors, of which the following is a specification.

The object of this invention is to allow for the use of storage-batteries upon the car and for bringing into action any desired amount of electro-motive force from said batteries in order that power exerted by the electric motor in propelling the car may be proportioned to the weight upon such car and the grade over which such car is being propelled, and by my improvements I am enabled to run the electric motor or car in either one direction or the other, and the circuit-connections are so arranged that the driver or attendant can always be at the advancing end of the car to have the most perfect control of the same.

Figure 3:
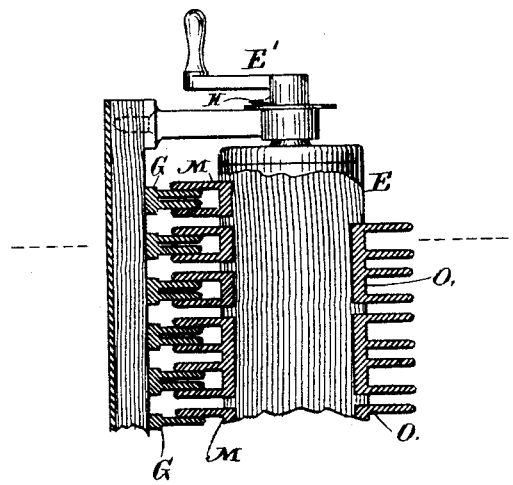
Figure 4:
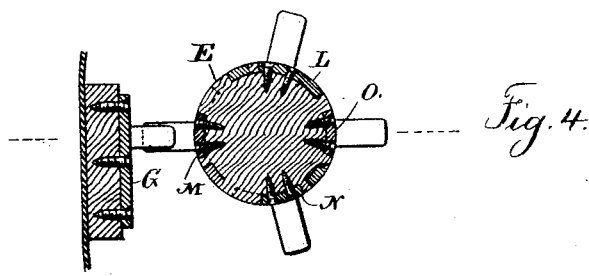
Figure 2:
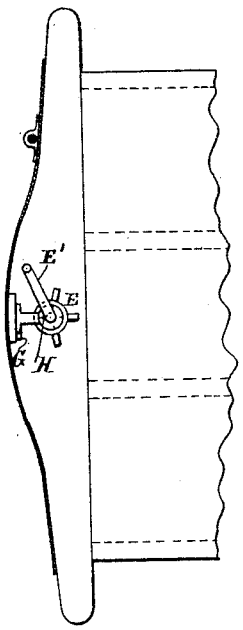

In the drawings, Figure 1 is a diagram of the secondary batteries and circuit-connections to the motor. Fig. 2 is a plan view of the cylindrical circuit-controller and of a portion of a car. Fig. 3 is a partial vertical section of the same. Fig. 4 is a sectional plan of such circuit-closing cylinder in larger size. Fig. 5 is an elevation of the range of stationary contacts. Figs. 6, 7, 8, and 9 are elevations of the circuit-closing devices upon the cylindrical circuit-closer.

The secondary or storage batteries are to be of any desired character and of sufficient capacity to furnish the maximum power required. These storage-batteries are represented at A A', and the motor made use of in driving the car is also of any desired character and is to be capable of exerting the maximum power required in propelling the car.

In the drawings, B B represent the field-magnets, and C the armature; D, the brushes or contacts of the commutator.

I have represented fifteen contact-blocks, numbered, respectively, from 1 to 15, and there is to be a range of these contact-blocks at each end of the car, as at G G', and for convenience these ranges may be vertical and connected with the dash-board or guard upon the platform at each end of the car; but the position of each range of circuit-closing devices may be varied within or upon the car, wherever most convenient. Adjacent to this range of stationary contacts is a cylinder E, suitably journaled at its ends and provided with a handle E' or other suitable means for revolving the same, and there is to be an index or pointer H used in connection with the handle and cylindrical circuit-closer to denote the different places to which the handle is to be turned, according to the power required from the motor, and upon the cylinder are two, three, or more longitudinal ranges of circuit-connecting devices. I have represented four of these longitudinal ranges of circuit-connecting devices L M N O, and they are adapted to bring into action equal groups of cells in multiple arc, such as four groups of twenty-one cells each, three groups of twenty-eight cells each, two groups of forty-two cells each, or the eighty-four cells in series, according to the electric force required in the motor to propel the car at the proper speed upon a level or an inclined track and according to the weight carried by the car.

Upon reference to Fig. 1 it will be seen that the circuit-connections run from end to end of the car, and the wires are numbered 1 to 15, respectively, and such wires terminate at the ranges of contact-blocks at the respective ends of the car. Any desired form of contact is to be provided on each block in the ranges G G', and also upon the blocks in the circuit-connecting devices L M N O. I have represented and prefer to use forks upon the respective parts, as indicated in Fig. 3, the forks upon the ranges of circuit-connecting devices L M N O passing above and below the forks upon the ranges of conntact-blocks G G'. When the cylinder E at one end of the car is brought into action, the cylinder at the other end of the car is to be thrown out of action in consequence of the same being turned in such a manner that none of the contacts upon the cylinder touch the contacts in the range of contact-blocks.

Suppose that the range of circuit-connecting devices O is in contact with the range of contact-blocks G, it will be seen that the current passing from the battery by the wire 1 goes through the helices of the motor to the wire 14 and its contact-block, and from there through the lower plate of the circuit-connecting devices O to the contact-block and wire 15, thence through the armature and the connection to the wire 13 and its contact-block, and through the circuit-connectors in the range O to the wire 12, and from thence through the storage-batteries by the wires 10, 11, 9, 8, 7, 6, 5, 4, 3, 2, and 1 to the field-helices of the motor, thus putting eighty-four cells of battery in series through the field and armature helices of the motor to obtain the maximum power. If now the cylinder E is turned to bring the range N of circuit-connecting devices into contact with the range G of blocks, the circuit-connection will remain the same, except that the wires 12 and 13 are connected with the wire 8, and the wire 7 is connected with the wire 1, thereby dividing the battery into two groups of forty-two cells each in multiple arc in the circuit, and when the range of circuit-connecting devices M is in contact with the range G of blocks the wires 12 and 13 are connected with 8 and 4, and the wires 9 and 5 are connected with the wires 1, thereby reducing the electro-motive force to three groups of twenty-eight cells, and when the range L of circuit-connecting devices is in contact with the range of blocks the wires 12 and 13 are connected with wires 10, 8, and 2, and the wires 11, 17, and 3 are connected with the wire 1, thus still further reducing the electro-motive force to four groups of twenty-one cells each in multiple arc.

It is to be understood that the arrangements of these circuit-connecting devices can be varied to bring into action any desired electro-motive force, and by arranging the respective wires as shown and terminating them at the ranges G and G' of contact-blocks the motor can be brought into action from either end of the car, and when either range of circuit-connecting blocks on the cylinder E is brought into contact with the range G' of contact-blocks the number of cells can be varied, as before illustrated; but in consequence of the change of position of the respective connections the wires 15 and 13 are transposed, and at the range G' of contact-blocks the current comes in from 1 through the helices of the field-magnets to the wire 14, and passes from the corresponding contact to the wire 13, and from there through the armature of the motor to the wire 15, and from there to the wire 12, returning to the battery, as before described, so that the circuit through the armature-helices is reversed and the motor caused to revolve in the opposite direction and drive the car with the range of contact-blocks G', and the cylinder that is in contact with the same in the front of the car.

It is to be understood that I do not claim any special construction of the contact-plates or circuit-connections upon the cylinder F, as the same may be varied according to the number of cells of battery and the respective electro-motive forces to be brought into action in propelling the car.

I claim as my invention—

1. The combination, with an electric motor for a car and secondary batteries, of two ranges of contact-blocks, one near each end of the car, two cylinders and ranges of circuit-connecting devices, substantially as set forth, for bringing into action more or less electro-motive force, and the wires 13 and 15, leading to the commutator-brushes and transposed in position in the two ranges of contact-blocks, so that the motor is rotated in either one direction or the other, according to which one of the cylinders E is made use of, substantially as set forth.

2. The combination, with a car and an electric motor for propelling the same, of secondary batteries and two ranges of contact-blocks, one near each end of the car, and two cylinders containing circuit-connecting devices, one adjacent to each range of contact-blocks, the handle to each cylinder for rotating the same, a pointer and index to indicate the respective positions to which each cylinder is to be turned, and the circuit-connecting wires to the batteries, field-helices and armature-helices, substantially as set forth, the connections to the helices being transposed at the ranges of contact-blocks, in order that the motor may be rotated in one direction when the circuit-connections pass through one of the cylinders and in the other direction when the circuit-connections pass through the other cylinder, substantially as set forth.

3. A cylinder or regulator for groups of batteries having in combination with contact plates or blocks for each group separate contacts for the field-magnets and armature and suitable contact-plates, the said contact plates or blocks for the batteries and the said contacts for the field-magnets and armature being all mechanically connected to move together and arranged and adapted to operate substantially as set forth.

4. The combination, with an electric circuit, of groups of batteries, a motor and cylinders having separate series of contacts adapted to connect said batteries with opposite poles of said motor, all of said contacts in each cylinder being mechanically connected so as to move together, substantially as set forth.

5. The combination, in an electric circuit, of batteries or groups of batteries, an electric motor and a cylinder or regulator having a plurality of series of contacts, each series containing contacts for the terminals of each battery or group of batteries, the motor field-magnets and the motor-armature and the several series being connected up in various ways, all of said contacts being operatively connected to move together, substantially as set forth.

6. The combination, on a car, of a number of batteries or groups of batteries, an electric motor for driving said car, and two identical current-regulators on opposite ends of said car, each regulator having a series of contacts in independent connection with the terminals of said batteries and of the motor field-magnets and armature, and a series of contact-plates adapted to be brought in contact with said contacts, the plates of different series on the respective regulators being so connected to other plates of the same series as to connect the battery-terminals to opposite terminals of the motor-armature as one or the other regulator is employed, substantially as specified.

Signed by me this 30th day of October, 1889.

A. A. INGRAHAM.

Witnesses:
 GEO. T. PINCKNEY,
 WILLIAM G. MOTT.